United States Patent [19]

Sharma et al.

[11] Patent Number: 5,219,819
[45] Date of Patent: * Jun. 15, 1993

[54] COPPER CRYSTALLITE IN CARBON MOLECULAR SIEVES FOR SELECTIVE OXYGEN REMOVAL

[75] Inventors: Pramod K. Sharma, La Canada; Panchalam K. Seshan, Diamond Bar, both of Calif.

[73] Assignee: California Institute of Technology, Pasadena, Calif.

[*] Notice: The portion of the term of this patent subsequent to Jan. 14, 2009 has been disclaimed.

[21] Appl. No.: 817,878

[22] Filed: Jan. 7, 1992

Related U.S. Application Data

[63] Continuation-in-part of Ser. No. 467,815, Jan. 22, 1990, Pat. No. 5,081,097.

[51] Int. Cl.$^5$ .................. B01J 20/20; C01B 13/00; B11J 21/18; B01D 53/04
[52] U.S. Cl. ........................ 502/417; 55/68; 55/74; 423/219; 502/53; 502/183; 502/423; 502/437
[58] Field of Search ............... 502/184, 185, 325, 328, 502/332, 350, 417, 423, 437

[56] References Cited

U.S. PATENT DOCUMENTS

| | | | |
|---|---|---|---|
| 1,559,054 | 10/1925 | Smith | 502/423 |
| 3,793,224 | 2/1974 | Cooper | 252/423 |
| 3,806,466 | 4/1974 | Bird et al. | 252/422 |
| 3,886,093 | 5/1975 | Dimitri | 252/447 |
| 3,979,329 | 9/1976 | Cooper | 252/422 |
| 4,242,226 | 12/1980 | Sirén | 252/422 |
| 4,420,415 | 12/1983 | Yuki et al. | 502/180 |
| 4,540,678 | 9/1985 | Sutt, Jr. | 502/5 |
| 4,627,857 | 12/1986 | Sutt, Jr. | 55/70 |
| 4,629,476 | 12/1986 | Sutt, Jr. | 55/68 |
| 4,742,040 | 5/1988 | Ohsahi et al. | 502/426 |
| 4,793,980 | 12/1988 | Torobin | 423/213.5 |
| 4,970,189 | 11/1990 | Tachibana | 502/183 |
| 5,081,097 | 1/1992 | Sharma et al. | 502/417 |

OTHER PUBLICATIONS

Nakahara, T., Hirata, M., and Omori, T., *J. Chem. Eng. Data* 19 No. 4 (1974) 310.
Nandi, S. P., and Walker, P. L., *Fuel* 54 (1975) 169.
Sharma, S. P., and Seshan, P. K., *Gas Separation and Purification*, 4 (1990) 203.
Foley, H. C., *ACS Symp. Ser.*, 368 (1988) 335.
Cullity, B. D., *Elements of X-Ray Diffraction*, II Edition Addison-Wesley, Reading, Mass. (1978) 284–285.
Pollack, S. S., and Yen, T. F., "Structural Studies of Asphaltics by X-Ray Small Angle Scattering", *Analytical Chemistry*, 42 (1970) 623.

*Primary Examiner*—Paul E. Konopka
*Attorney, Agent, or Firm*—F. Eugene Logan

[57] ABSTRACT

Carbon molecular sieves modified by the incorporation of finely divided elemental copper useful for the selective sorption of oxygen at elevated temperatures. The carbon molecular sieves can be regenerated by reduction with hydrogen. The copper modified carbon molecular sieves are prepared by pyrolysis of a mixture of a copper-containing material and polyfurfuryl alcohol to form a sorbent precursor. The sorbent precursors are then heated and reduced to produce copper modified carbon molecular sieves. The copper modified carbon molecular sieves are useful for sorption of all concentrations of oxygen at temperatures up to about 200° C. They are also useful for removal of trace amount of oxygen from gases at temperatures up to about 600° C.

15 Claims, 15 Drawing Sheets

COPPER CRYSTALLITE IN CARBON MOLECULAR SIEVES FOR SELECTIVE OXYGEN REMOVAL

ORIGIN OF INVENTION

The invention described herein was made in the performance of work under a NASA contract, and is subject to the provisions of Public Law 96-517 (35 USC 202) in which the Contractor has elected to retain title.

RELATED U.S. APPLICATION

Continuation-in-Part of Ser. No. 467,815 filed Jan. 22, 1990, now U.S. Pat. No. 5,081,097.

BACKGROUND OF THE INVENTION

Carbon molecular sieves are amorphous materials having high surface area and pore sizes near the critical dimensions of small molecules. Early sieves were prepared by the pyrolysis of natural and synthetic precursors such as coconut shells and pitch. Carbon molecular sieves are typically made with pore sizes ranging from 3 to 12 Å, pore volumes from 0.2 to 0.5 cc/g, and surface areas from 300 to 1500 m$^2$/g. Properties of the sieves can be controlled by choice of carbon precursor, the pyrolysis conditions, and choice of additives, the latter of which usually influences the pore structure. The adsorptive properties of carbon molecular sieves will therefore vary widely depending on the above-mentioned factors.

The early applications of carbon molecular sieves were in the area of adsorption and separation of gas mixtures. The separation of gas molecules, which sometimes differ by as little as 0.2 Å in their critical dimensions, have been achieved with carbon molecular sieves. Such separations are possible due to kinetic effects caused by the dependence of the intermolecular force field on the molecules size. For example, in a mixture of nitrogen and oxygen, the oxygen molecules will experience an attractive force field while the nitrogen molecules will experience a repulsive force field. Commercial gas separations take advantage of such kinetic effects by using a pressure swing operating procedure to separate oxygen and nitrogen.

Further selectivity has been achieved with metal-containing carbon molecular sieves that also provide certain catalytic properties. For example, the preparation, adsorptive, and catalytic properties of a variety of metal-containing carbon molecular sieves have been reported in The Proceedings of the Second Conference on Industrial Carbon Graphite, Society of the Chemical Industry, London, 1966, The Journal Chemical Society D, 8, 477, 1970, and The Conference on Industrial Carbon Graphite, Third Meeting Date, Society Chemical Industry, London, 1970.

The preparation of a class of carbon molecular sieves which are functionalized with certain inorganic oxides and supported metals were reported in the American Chemical Society Symposium Series, 368, 335, 1988. These carbon molecular sieves were designed to combine the molecular sieving properties of the carbon with the surface chemical and physical properties of the particular inorganic oxides. In particular the preparation and characterization of carbon molecular sieves modified with titania, zirconia and alumina additives was described and molecular sieving effects were reported with relationship to pore size distribution, and inorganic oxide type and content. A carbon molecular sieve modified by the addition of titania prepared according to the procedure described in the last mentioned reference was made for purposes of comparison and designated as prior art sorbent composition CMS1.

A commercially available substance marketed as BASF Catalyst R 3-11, will, in its reduced form, remove oxygen from gases. However, the R3-11 sorbent also removes other gaseous species including gaseous sulfur, chlorine and similar materials by an irreversible reaction which permanently lowers the physical and chemisorptive properties of the sorbent. Moreover, temperatures higher than about 230° C. reportedly will permanently damage the R3-11 sorbent.

None of the above-mentioned sorptive materials, provide sorbents which selectively remove oxygen from a gaseous mixture without also simultaneously sorbing substantial amounts of other gaseous species, especially other species having about the same characteristic diameter as oxygen, and without also sorbing gaseous species that permanently decrease the oxygen uptake of the sorbent.

What is therefore needed is a sorbent which will selectively sorb oxygen without sorbing other gaseous species, including gaseous species having about the same characteristic diameter, and without sorbing gaseous species that will permanently damage the sorbent such as sulfur and chlorine.

SUMMARY OF THE INVENTION

It is an object of this invention to provide a sorbent having both molecular sieving capability and catalytic reacting capability.

It is also an object of this invention to provide a sorbent operable for the selective removal of molecular oxygen from a gas.

Another object of this invention is to provide a sorbent which will selectively remove molecular oxygen from a gas containing other gaseous species including species having about the same effective diameter as molecular oxygen.

Yet another object of this invention is to provide a sorbent which will selectively remove molecular oxygen from a gas containing other gaseous species including species having about the same effective diameter as molecular oxygen without the necessity of using a pressure swing type of sorption-desorption operation as is used in commercially available carbon molecular sieves.

Still another object of this invention is to provide a sorbent which will not be deactivated by gaseous species other than molecular oxygen, including but not limited to gaseous sulfur, chlorine and similar gaseous species which frequently will permanently deactivate many sorbents.

It is also an object of this invention to provide a sorbent which will remove trace amounts of molecular oxygen from nearly pure gases thereby producing a gas which is completely free of molecular oxygen.

Another object of this invention is to provide a sorbent which will remove molecular oxygen in all concentrations from a gas at temperatures up to about 200° C.

Still another object of this invention is to provide a sorbent which will remove molecular oxygen in concentrations up to 1000 ppm from a gas at temperatures up to about 400° C.

Yet another object of this invention is to provide a sorbent which will remove molecular oxygen in concentrations up to about 100 ppm from a gas at temperatures up to about 600° C.

Another object of this invention is to provide a sorbent which will lower trace amounts of molecular oxygen from a gas to a level less than about 10 ppb, preferably less than about 1 ppb, and especially preferably less than about one part per trillion or 1 ppt, at temperatures up to about 600° C.

It is also an object of this invention to provide a sorbent comprising finely divided elemental copper uniformly dispersed in the matrix of a carbon molecular sieve.

Another object of this invention is to provide a sorbent which can be regenerated.

It is also an object of this invention to provide a process for making the above mentioned sorbents.

Because the sorbents of this invention have both molecular sieving capability and catalytic reacting capability, the sorbents are sometimes referred to herein as "molecular sieve-sorbents" or other times for brevity as merely "sorbents".

This invention is therefore directed towards carbon molecular sieves modified by incorporation of copper uniformly into the carbon molecular sieve matrix. Sorbents of this invention are capable of selectively removing molecular oxygen from a gas mixture at temperatures from about 0° C. to about 600° C. In this invention copper in elemental form was successfully incorporated in carbon molecular sieves in such a manner that oxidation of the copper is catalyzed while oxidation of the carbon is retarded, and, while the physical separation properties and sorptive capabilities of the carbon molecular sieves are retained and maintained.

Oxidation of the carbon of the sorbent of this invention was successfully retarded at temperatures up to about 200° C. while the sorbent removed molecular oxygen from a gas which was 100% oxygen. At still higher elevated temperatures, and after a period of time, oxidation of the carbon of the sorbent occurred. The period of time varied depending on the percent oxygen in the treated gas, and the temperature and composition of the particular sorbent. However, usage of the sorbents of this invention are nevertheless useful at such higher elevated temperatures for selectively removing molecular oxygen from gases containing small concentrations or trace amounts of oxygen up to the point of the onset of carbon oxidation.

Accordingly there is provided by the principles of this invention a sorbent comprising a carbon molecular sieve and finely divided elemental copper uniformly dispersed in the matrix of the carbon molecular sieve. The sorbent has both molecular sieving capability and catalytic activity. The sorbent is operable for selectively removing molecular oxygen from a gas containing molecular oxygen. The sorbent removes molecular oxygen by converting the molecular oxygen to copper oxide by catalytic oxidation of the finely divided elemental copper. In one embodiment the sorbent is operable for selectively removing molecular oxygen from a gas containing any concentration of molecular oxygen at temperatures up to about 200° C.

In another embodiment of this invention the sorbent is operable for selectively removing molecular oxygen from a gas containing a concentration of molecular oxygen less than about 1000 ppm at temperatures up to about 400° C. In still another embodiment the sorbent is operable for selectively removing molecular oxygen from a gas containing a concentration of molecular oxygen less than about 100 ppm at temperatures up to about 600° C. In a further embodiment the sorbent is operable for selectively removing molecular oxygen from a gas containing a concentration of molecular oxygen less than about 100 ppt at temperatures up to about 600° C.

In this invention the finely divided particles of elemental copper have an average crystallite size of from about 100 Å to about 400 Å, the finely divided elemental copper content of the molecular sieve-sorbent is from about 1 to about 40% by weight, and the carbon content thereof is from about 60 to about 99% by weight. In one embodiment the average crystallite size of the finely divided particles of elemental copper is from about 140 Å to about 300 Å. In another embodiment the average crystallite size of the finely divided particles of elemental copper is from about 200 Å to about 400 Å as measured by the Porod method. In still another embodiment the average crystallite size of the finely divided particles of elemental copper is from about 100 Å to about 200 Å as measured by the Warren-Averbach method.

In one embodiment the elemental copper content of the molecular sieve-sorbent is from about 2 to about 30% by weight and the carbon content is from about 70 to about 98% by weight. In another embodiment the elemental copper content of the molecular sieve-sorbent is from about 3 to about 25% by weight and the carbon content is from about 75 to about 97% by weight.

In one embodiment the copper modified carbon molecular sieve-sorbent has an effective pore size no greater than about 4.3 Å.

In one embodiment of this invention at least about 10% of the finely divided elemental copper of the sorbent will selectively react with molecular oxygen in a gas containing molecular oxygen. In a still further embodiment at least about 20% of the finely divided elemental copper of the sorbent will selectively react with the molecular oxygen. In yet a further embodiment at least about 30% of the finely divided elemental copper of the sorbent will selectively react with the molecular oxygen. In an especially preferred embodiment at least about 50% of the finely divided elemental copper of the sorbent will selectively react with the molecular oxygen.

The sorbent of this invention, after sorbing molecular oxygen, can be regenerated by heating and reducing the sorbent at an elevated temperature for a predetermined period of time. In one embodiment of this invention the sorbent is regenerated by heating the sorbent to an elevated temperature of at least as high as about 150° C. in a reducing environment for a predetermined period of time. In still another embodiment of this invention the sorbent can be regenerated by heating the sorbent to an elevated temperature of at least as high as about 150° C. in a dilute hydrogen-inert gas mixture for a predetermined period of time. In yet another embodiment of this invention the sorbent is regenerated by heating the sorbent to an elevated temperature of at least as high as about 200° C. in a reducing environment for a predetermined period of time.

There is also provided by the principles of this invention a sorbent containing finely divided copper oxide uniformly dispersed in a carbon molecular sieve, the sorbent being formed by pyrolyzing a mixture of a carbon-containing substance and a copper-containing material into a copper oxide containing carbon molecular sieve and, after pyrolyzing, reducing the copper oxide containing carbon molecular sieve to form a reduced sorbent having finely divided elemental copper uniformly dispersed in a carbon molecular sieve matrix. In one embodiment of this invention the copper-containing material is selected from the group consisting of cupric acetate, cupric acetyl acetonate, cupric formate and mixtures thereof. In another embodiment of this invention the carbon-containing substance is selected from the group consisting of polyfurfuryl alcohol, polyacrylonitrile, phenol-formaldehyde resin, polyvinylidene chloride and mixtures thereof.

There is also provided by the principles of this invention a process for making a sorbent precursor having finely divided copper oxide uniformly dispersed in a carbon molecular sieve comprising forming a mixture by dispersing or dissolving a copper-containing material, a carbon-containing substance, and a distributing agent selected from the group consisting of (i) dispersing agents operable for dispersing the copper-containing material in the mixture, (ii) dissolving agents operable for dissolving the copper-containing material, and (iii) mixtures thereof. In this invention the carbon-containing substance is transformable into a carbon molecular sieve by pyrolysis, and the copper-containing material is simultaneously transformable into copper oxide by the pyrolysis. The process further comprises pyrolyzing the thusly formed mixture at an elevated temperature in a non-deleteriously reacting environment for a predetermined period of time operable for transforming the mixture into a sorbent precursor having finely divided copper oxide uniformly dispersed in a carbon molecular sieve matrix.

In a further embodiment the process also comprises reducing the finely divided copper oxide in the sorbent precursor to form a reduced sorbent having finely divided elemental copper uniformly dispersed in a molecular sieve. In one embodiment the reduction of the sorbent precursor is by treating the sorbent precursor with molecular hydrogen at an elevated temperature to form the reduced sorbent.

In another embodiment the copper-containing material is cupric acetate, the carbon-containing substance is polyfurfuryl alcohol, and the distributing agent is methanol. In still another embodiment the copper-containing material is cupric acetyl acetonate and the carbon-containing substance and the distributing agent are polyfurfuryl alcohol.

There is also provided by the principles of this invention a process for removing molecular oxygen from gases; and, a process for producing gases which are free of molecular oxygen. Accordingly there is provided a process for reducing the concentration of molecular oxygen in a gaseous mixture comprising contacting the gaseous mixture with a carbon molecular sieve having finely divided elemental copper uniformly or homogeneously distributed in the carbon molecular sieve at an elevated temperature for a period of time effective for transforming the molecular oxygen into copper oxide by catalytic oxidation of the finely divided elemental copper thereby reducing the concentration of the molecular oxygen in the gaseous mixture; and, after the period of time, recovering the gaseous mixture having a reduced concentration of molecular oxygen. In one embodiment the concentration of molecular oxygen in the gaseous mixture before contacting with the carbon molecular sieve is no greater than about 100 ppm, and the elevated temperature and the period of time of the contacting are effective for reducing the concentration of the molecular oxygen in the gaseous mixture to no greater than about 10 ppb and preferably to no greater than about 1 ppb. In another embodiment the elevated temperature is from about 100° C. to about 600° C. In still another embodiment the process further comprises, prior to the contacting the gaseous mixture with the sorbent, conditioning the carbon molecular sieve at an elevated temperature of at least about 300° C. under a vacuum for a predetermined period of time operable for degassing the sorbent.

DESCRIPTION OF THE PREFERRED EMBODIMENTS

Figure 1:
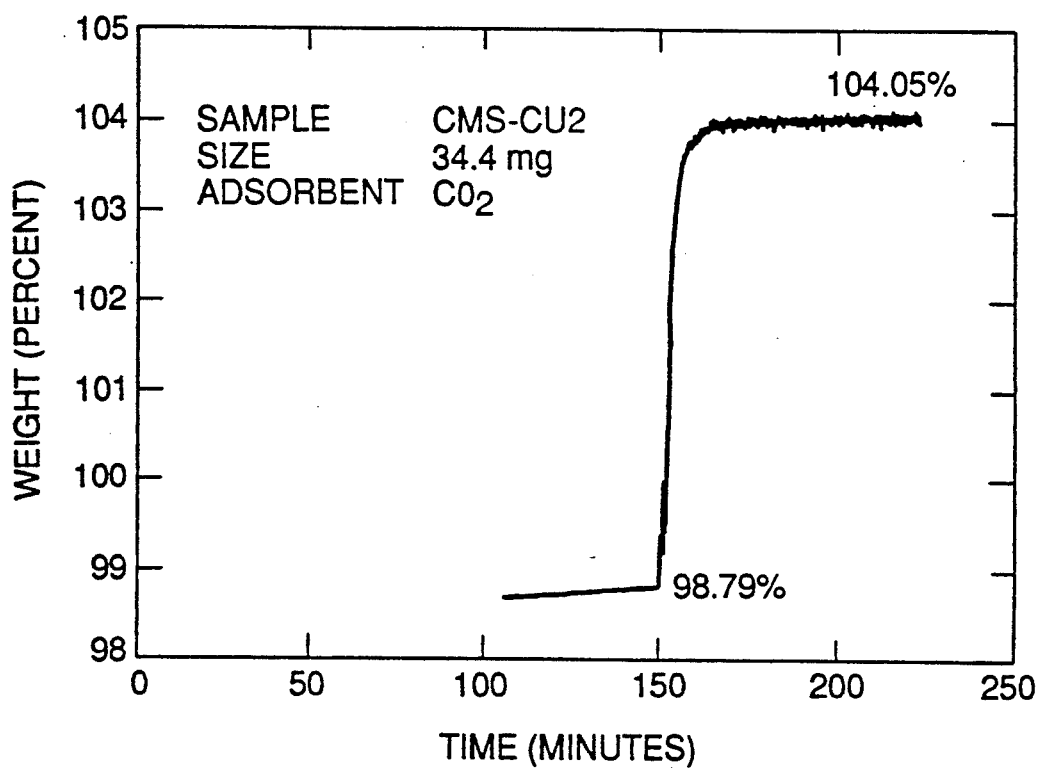
FIG. 1 is an adsorption curve for $CO_2$ on a first sorbent precursor composition designated CMS-CU2 of this invention conducted at 35° C.

The preparation of copper-containing carbon molecular sieves of this invention can be carried out by mixing a carbon-containing substance operable for pyrolyzing into a carbon molecular sieve, with effective amount of a copper-containing material operable for simultaneous pyrolyzing into finely divided copper oxide, and, pyrolyzing the mixture under inert conditions to produce an oxidized sorbent or sorbent precursor. In one embodiment the carbon-containing substance is polyfurfuryl alcohol which is mixed with an effective amount of a copper-containing compound, and then pyrolyzed to produce a homogeneously mixed copper oxide in a carbon molecular sieve matrix or sorbent precursor. The thusly produced sorbent precursor was then heated in a hydrogen-containing environment to reduce the copper oxide to elemental copper while maintaining the copper homogeneously dispersed in the matrix of the carbon molecular sieve thereby producing a reduced sorbent.

The copper compounds or copper-containing materials added to the polyfurfuryl alcohol were cupric acetate, cupric acetyl acetonate, phenol-formaldehyde resin and polyvinylidene chloride. Since cupric acetate did not dissolve in polyfurfuryl alcohol, cupric acetate was first dissolved in methanol which served as a distributing agent for the cupric acetate. The cupric acetate-methanol solution was then added to the polyfurfuryl alcohol. As the polyfurfuryl alcohol dissolved in the methanol the cupric acetate was seen to precipitate. However, since the precipitate consisted of very small particles which were observed to mix well and become uniformly distributed and homogenated in the bulk of the mixture, the precipitation did not present a problem. After mixing, the remaining methanol was removed from the mixture by room temperature evaporation. In particular, a solution of 1.0 g cupric acetate in 200 ml methanol was added to 2 ml of polyfurfuryl alcohol. The mixture was stirred and allowed to evaporate at room temperature for 16 hours. The resulting mixture, which was a paste, was stirred and stored for subsequent pyrolysis.

In another embodiment of this invention the addition of cupric acetyl acetonate to polyfurfuryl alcohol was performed by physical mixing alone since this copper-containing material appeared to distribute by dissolving in the polyfurfuryl alcohol and produce a homogeneous paste. The resulting paste was stirred and stored for subsequent pyrolysis.

Both of the thusly prepared mixtures or pastes were pyrolyzed to form a carbon molecular sieve having finely divided copper oxide uniformly distributed therein, sometimes referred to herein as oxidized sorbent or sorbent precursor. The pyrolysis of each of the pastes was conducted in a quartz furnace under a constant flow of 140 cc/min of high purity nitrogen using the following sequential heat cycle:

1.0 hr at 100° C.,
0.5 hr at 200° C.,
0.5 hr at 300° C.,
0.5 hr at 400° C.,
0.5 hr at 500° C., and
3.0 hrs at 600° C.

The nitrogen flow during the entire heat cycle was 140 cc/min. At the end of the heat cycle, the pyrolysis product or sorbent precursor was cooled to room temperature while maintaining the nitrogen flow at the above-mentioned rate.

The sorbent precursor was reduced in a flow of 2-5% hydrogen/95-98% argon gas mixture for 12-16 hours at a temperature of 220° C. to form a carbon molecular sieve matrix having finely divided elemental copper uniformly distributed therein or reduced sorbent.

The characterization of the copper modified carbon molecular sieve-sorbents of this invention and investigation of their oxygen uptake were conducted using a Dupont 951 Thermogravimetric Analyzer, X-Ray Photoelectron Spectroscopy and X-Ray Diffraction, hereinafter referred to as "TGA", "XPS" and "XRD".

The characterization of the sorbent precursors was carried out by using carbon dioxide, n-butane and isobutane as probe gases. The reported critical dimensions or characteristic diameters of these probe gases are 3.3, 4.3, and 5.0 Å, respectively. The sorbent precursor samples were preconditioned by flushing in argon to 300° C., terminating the argon flow, and continuing heating in vacuum to 300° C. for one hour, and then cooling under vacuum to 35° C. to ready the samples for subsequent adsorptive study. This procedure is referred to herein as preconditioning the sorbent. The vacuum condition was then terminated and the sample was contacted with the first probe gas flowing at a rate of about 100 cc/min for a period of one hour. The increase in the sample weight with time was monitored using an automatic data acquisition accessory to the TGA. Subsequently the sample was reconditioned by heating under vacuum using the preconditioning procedure described above, and brought in contact with the next probe gas.

For oxygen chemisorptive tests, the reduction of copper oxide modified carbon molecular sieve-sorbents of this invention was carried out by heating the sample in a flow of 2-5% hydrogen-95-98% argon gas mixture at a temperature of about 200° C. The sample size was typically 30 to 50 mg and the gas mixture flow rate was about 200 cc/min. The total reduction time was about 12-16 hours. At the end of each reduction, hydrogen flow was terminated and the sample brought to the desired test temperature in a flow of argon alone. Flow of 100% oxygen, or an oxygen-argon gas mixture, over the sample was initiated and the change in sample weight with time was monitored.

EXAMPLES

The copper modified carbon molecular sieve-sorbents of this invention that were characterized and investigated are listed in Table 1. Table 1 shows the particular copper additive or copper-containing material used in the preparation of the sorbent and the copper and carbon weight percents in the sorbent. The copper weight percent was obtained by spectroscopic analysis. The carbon percent was obtained by mass balance on the sorbent precursor taking into account that the oxidized sorbent consists of copper oxide as CuO and carbon.

Figure 2:
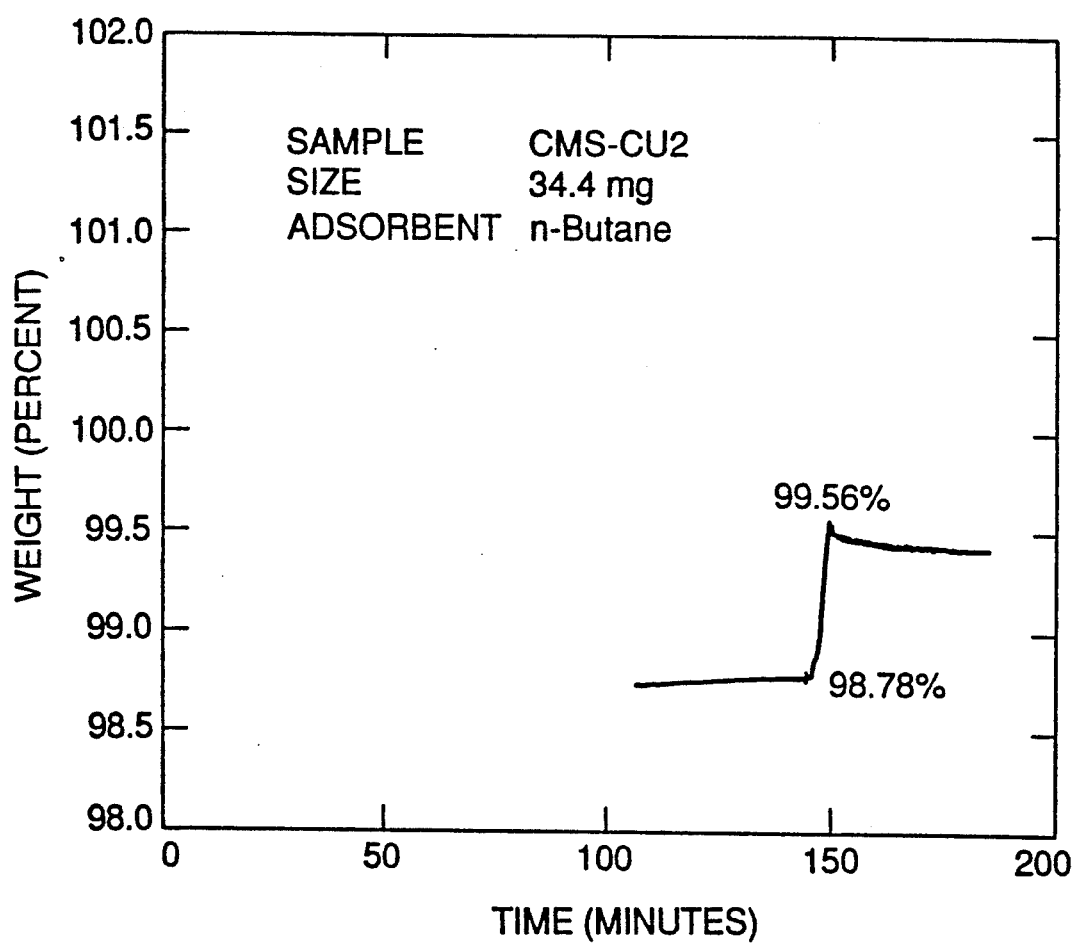
FIG. 2 is an adsorption curve for n-butane on the first sorbent precursor composition designated CMS-CU2 of this invention conducted at 35° C.
Figure 3:
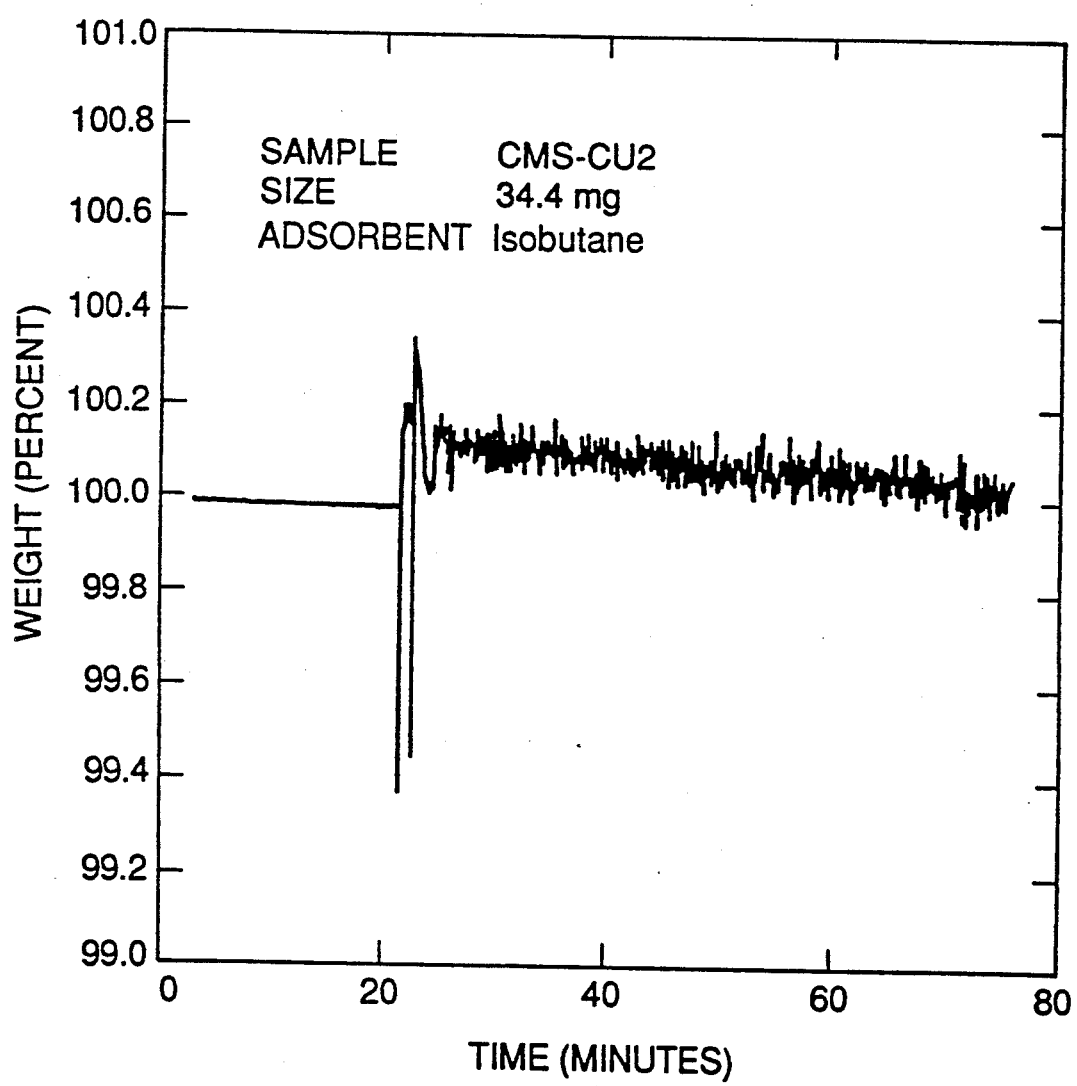
FIG. 3 is an adsorption curve for isobutane on the first sorbent precursor composition designated CMS-CU2 of this invention conducted at 35° C.

All of the copper modified carbon molecular sieve-sorbents of this invention exhibited molecular sieving properties in addition to catalytic oxidation or sorption properties attributable to the uniformly distributed finely divided elemental copper. FIGS. 1 to 3 show adsorption results obtained with a preconditioned sample of the sorbent of this invention having sorbent composition CMS-CU2, at a temperature of 35° C., using carbon dioxide, n-butane, and isobutane, respectively, as the probe gases. FIG. 1 shows that the carbon dioxide adsorption is about 5.25% of the sample sorbent weight. FIG. 2 shows that the n-butane adsorption is about 0.70% of the sample sorbent weight. FIG. 3 shows that the isobutane adsorption is about 0.10% of the sample sorbent weight. It can therefore be concluded that most of the pores of the sorbent of this composition are smaller than 4.3 Å and that very few are larger than 5.0 Å.

Figure 4:
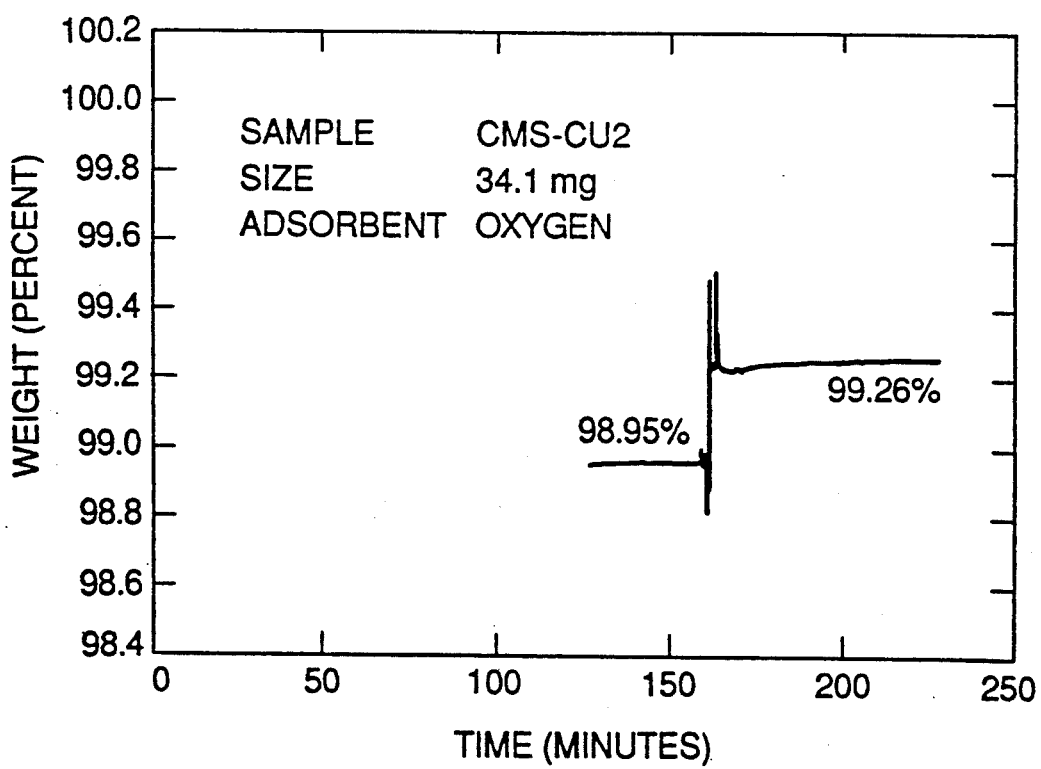
FIG. 4 is an adsorption curve for 100% oxygen on the first sorbent precursor composition designated CMS-CU2 of this invention conducted at 35° C.

After preconditioning at 300° C. under vacuum, the oxygen uptake at 35° C. from a stream of pure oxygen on a sorbent precursor sample, also having composition CMS-CU2, is shown in FIG. 4. From FIG. 4 it is seen that the total oxygen uptake is about 0.30% of the sorbent weight. Since this sample was preconditioned in vacuum the 0.30 wt % increase represents oxygen uptake. The uptake of argon on a similarly conditioned precursor sample at 35° C. was about 0.60% of the sorbent weight. These results are consistant with the somewhat larger molecule size and lower molecular weight of oxygen compared to argon.

At temperatures significantly above room temperature, the physical adsorption for most gases on all the sorbents of this invention is expected to be negligible. The chemisorption sites provided by the sorbents after reduction, however, will provide for substantial chemisorption of oxygen and thereby result in the selective removal of oxygen from a gaseous mixture.

Figure 5:
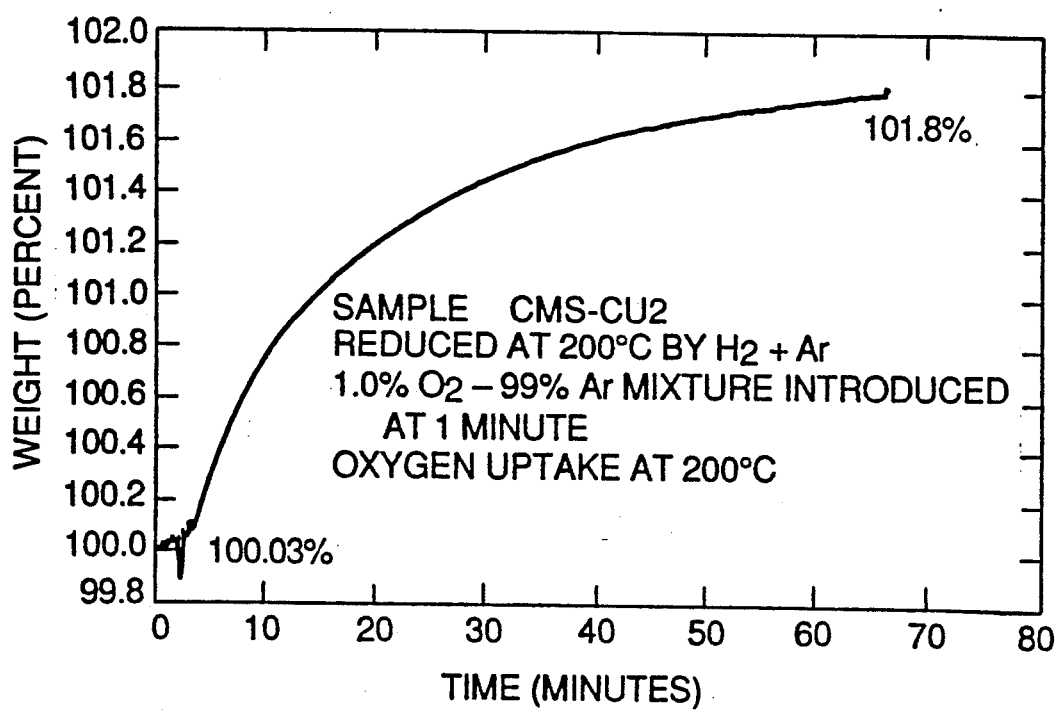
FIG. 5 is an oxygen uptake curve for oxygen from a 1% $O_2$/99% Ar gas mixture on the reduced first sorbent composition designated CMS-CU2 of this invention conducted at 200° C.
Figure 6:
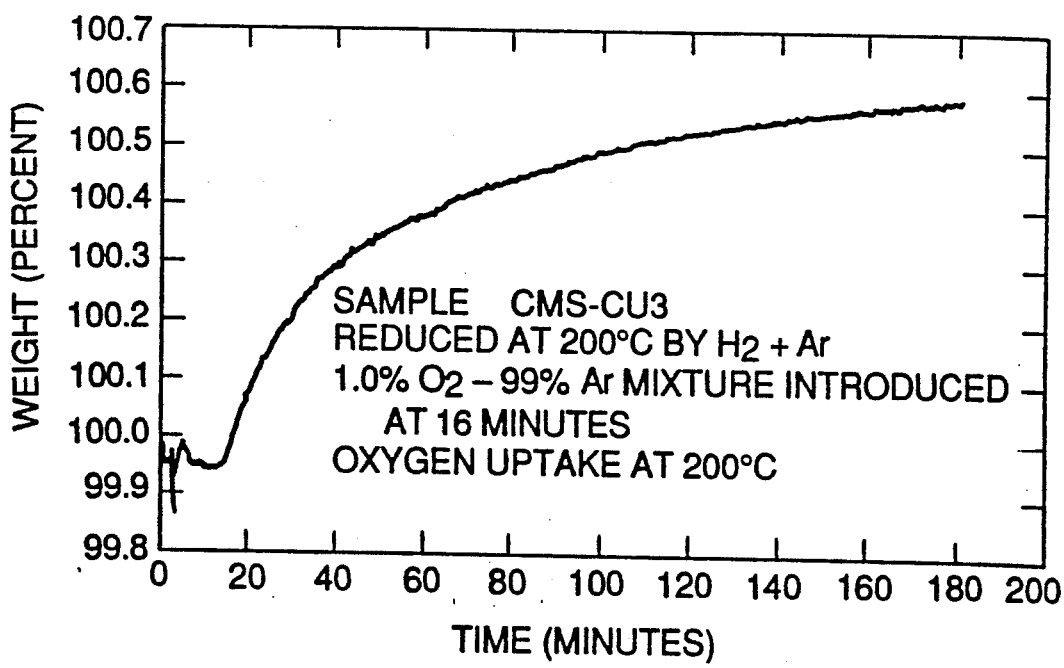
FIG. 6 is an oxygen uptake curve for oxygen from a 1% $O_2$/99% Ar gas mixture on a reduced second sorbent composition designated CMS-CU3 of this invention conducted at 200° C.
Figure 7:
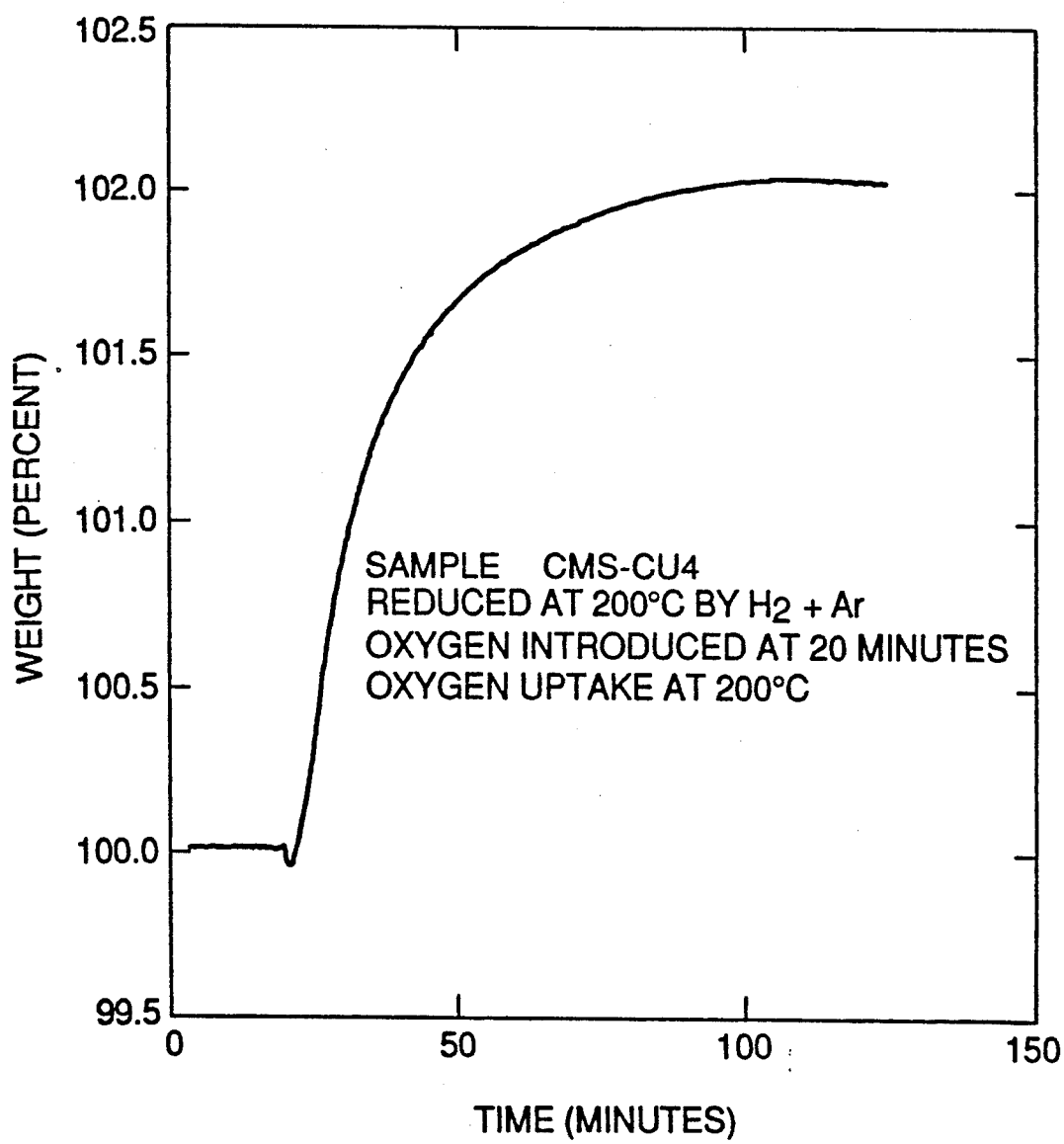
FIG. 7 is an oxygen uptake curve for oxygen from 100% oxygen on a reduced third sorbent composition designated CMS-CU4 of this invention conducted at 200° C.

The oxygen uptake by reduced sorbents at a temperature of about 200° C. is shown in FIGS. 5 to 7 for three sorbent compositions of this invention, designated as sorbent compositions CMS-CU2, CMS-CU3 and CMS-CU4, respectively. The gas used to contact the reduced sorbents consisted of 1.0% oxygen and 99.0% argon for CMS-CU2 and CMS-CU3, and pure oxygen for CMS-CU4. The maximum oxygen uptake and corresponding copper utilization values are shown in Table 1. The data show that at 200° C. the reduced first and third sorbent compositions, i.e. compositions CMS-CU2 and CMS-CU4, the total oxygen uptake was about 1.8% and 2.0%, respectively, of the sorbent sample weight. The copper utilization, i.e. the percent by weight of the copper oxidized in the sorbent sample, was about 30 to about 34%. The reduced second sorbent composition, CMS-CU3, had an oxygen uptake of about 0.70% of the sorbent sample weight and a copper utilization of about 70%. FIGS. 5 to 7 also show that the rate of oxygen uptake was faster for the first sorbent composition than for the other two compositions.

Figure 8:
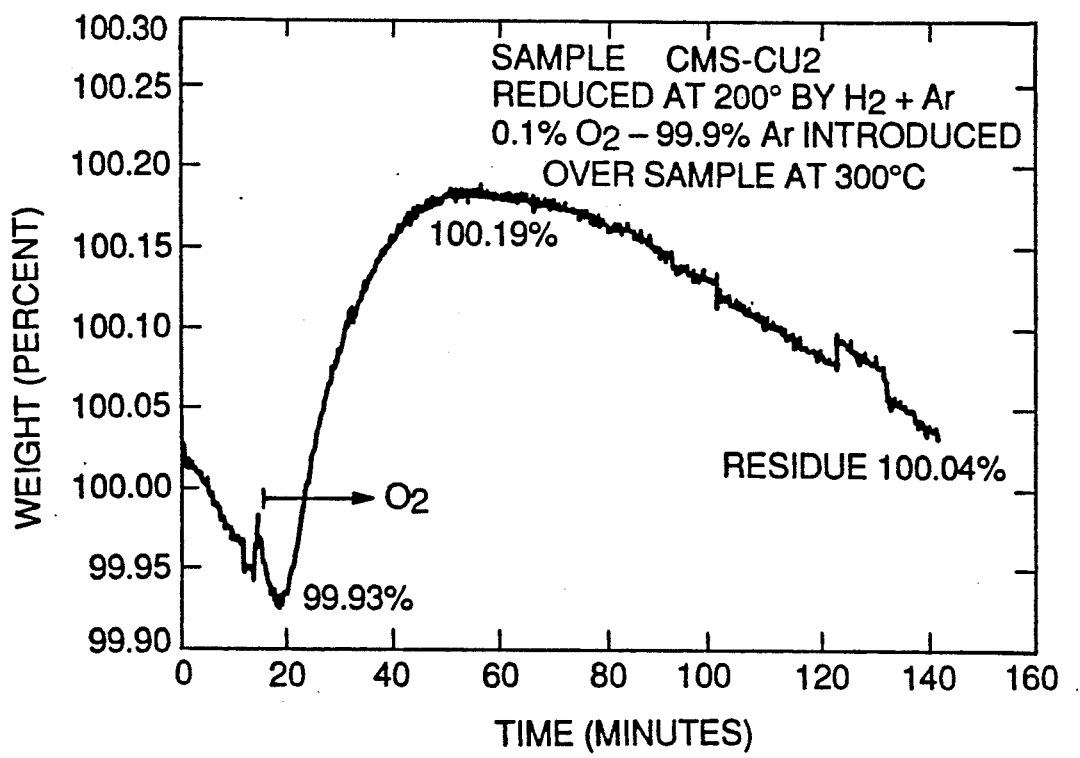
FIG. 8 is an oxygen uptake curve for oxygen from a 0.1% $O_2$/99.9% Ar gas mixture on the reduced first sorbent composition designated CMS-CU2 of this invention conducted at 300° C.
Figure 10:
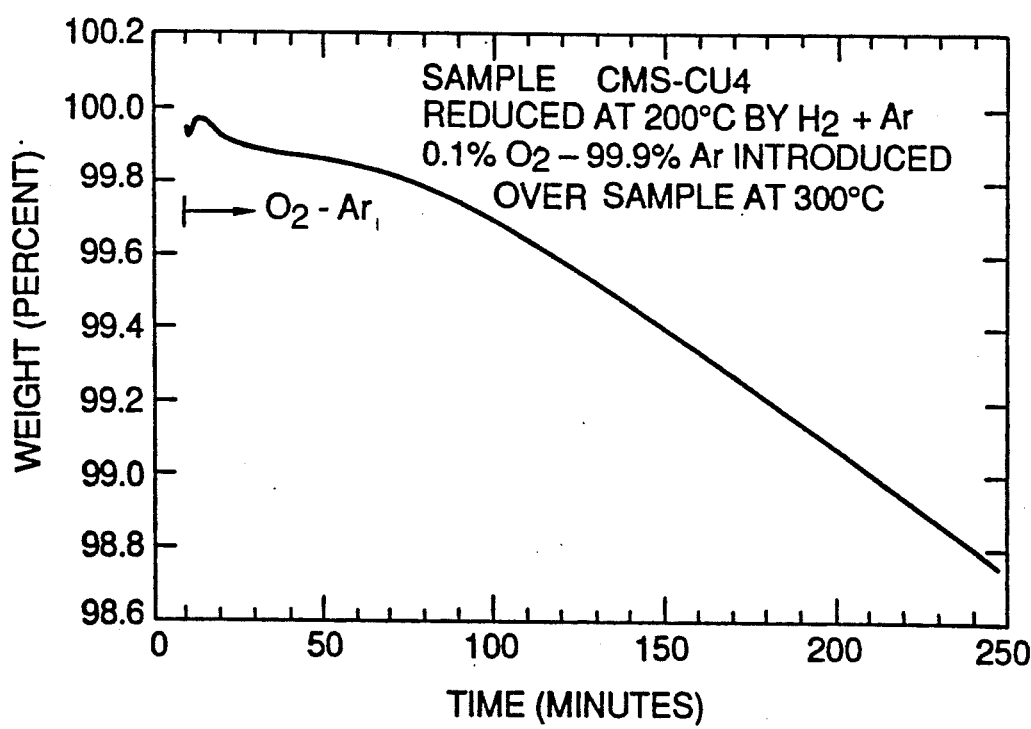
FIG. 10 is an oxygen uptake curve for oxygen from a 0.1% $O_2$/99.9% Ar gas mixture on the reduced third sorbent composition designated CMS-CU4 of this invention conducted at 300° C.
Figure 9:
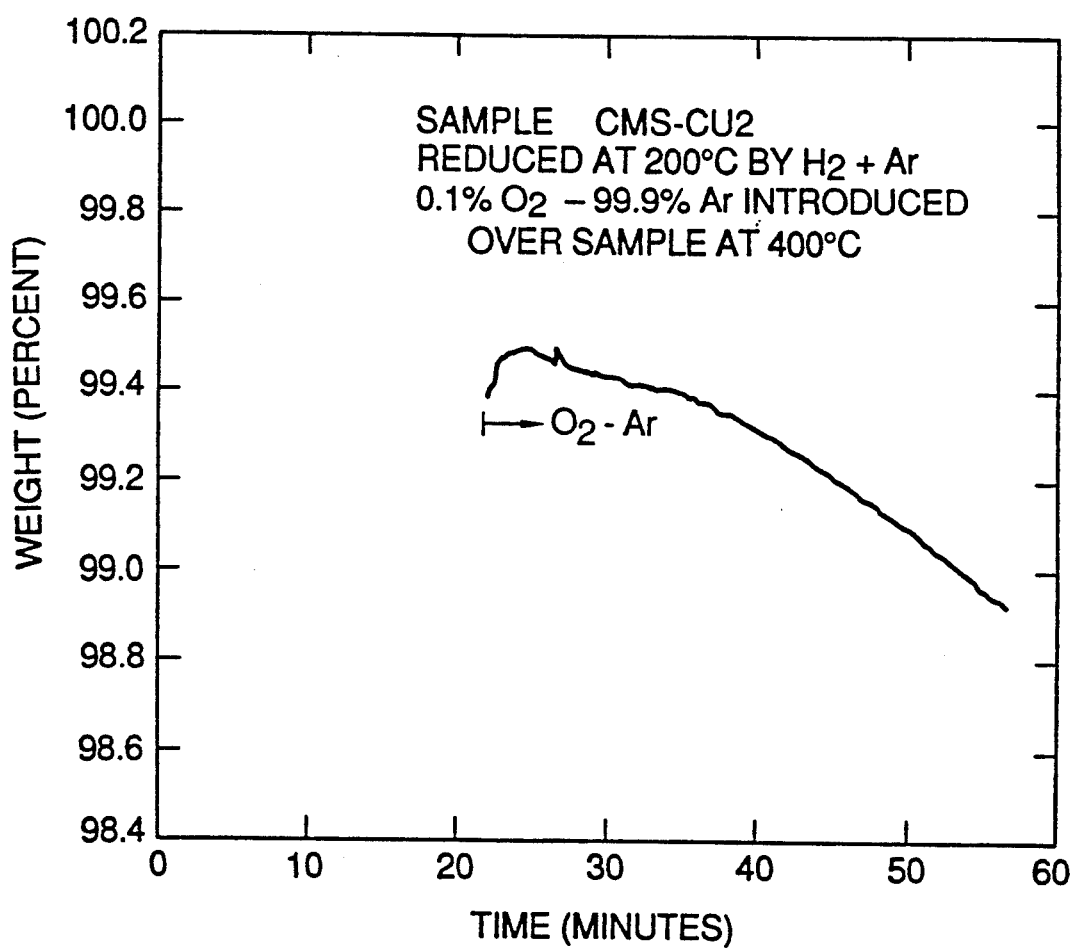
FIG. 9 is an oxygen uptake curve for oxygen from a 0.1% $O_2$/99.9% Ar gas mixture on the reduced first sorbent composition designated CMS-CU2 of this invention conducted at 400° C.

Oxygen uptake at temperatures of 300° C. and 400° C. was investigated with reduced samples using a 0.1% oxygen and 99.9% argon gas mixture. FIGS. 8 and 9 show the oxygen uptake curve for first sorbent composition at 300° C. and 400° C., respectively. At 300° C., FIG. 8, the reduced sorbent's oxygen uptake was about 0.25% of the sample weight, however, with continued exposure to the oxygen/argon gas stream the sample weight began to decrease which was attributed to carbon ignition due to hot spots in the sample. A similar result is seen in FIG. 9 for the reduced sorbent sample tested at 400° C. wherein initial oxygen uptake occurred for a few minutes followed by a decrease in sorbent weight. FIG. 10 shows the oxygen uptake curve for the reduced third sorbent composition, i.e. sorbent composition CMS-CU4, at 300° C. when subjected also to a 0.1% oxygen in argon gas stream. As seen in FIG. 10 there was a very short period of oxygen uptake followed by a continuous decline in sample weight indicating carbon ignition.

The data demonstrates that all of the reduced sorbents of this invention can be used for selective oxygen removal from a gas at temperature up to about 200° C. for any concentration of oxygen in the gas. At temperatures of 300° C. or higher, after a period of time, carbon ignition occurred when the oxygen concentration in the gas was 0.10% or higher. However, up until ignition occurs, or, for lower concentrations of oxygen in the treated gas, the reduced sorbents removed oxygen even at temperatures of 300° C. and 400° C. It is believed that for trace amounts of oxygen, i.e. about 100 ppm, and especially about 20 ppm or lower, the reduced sorbents of this invention will remove oxygen up to temperatures of about 600° C. In particular, since the capabilities of the sorbents of this invention to lower oxygen levels to less than 1 ppt are supported by thermodynamic calculations for the oxidation of copper to CuO and resulting equilibrium values of oxygen partial pressures, the sorbents of this invention are capable of reducing oxygen concentrations in the treated gas to below 1 ppt at temperature up to about 600° C.

The experimental data herein show that copper oxide can be incorporated in the matrix of carbon molecular sieves, which after reduction, produce copper modified carbon molecular sieves that are effective sorbents for selective removal of oxygen while retaining their molecular sieving properties.

Figure 11:
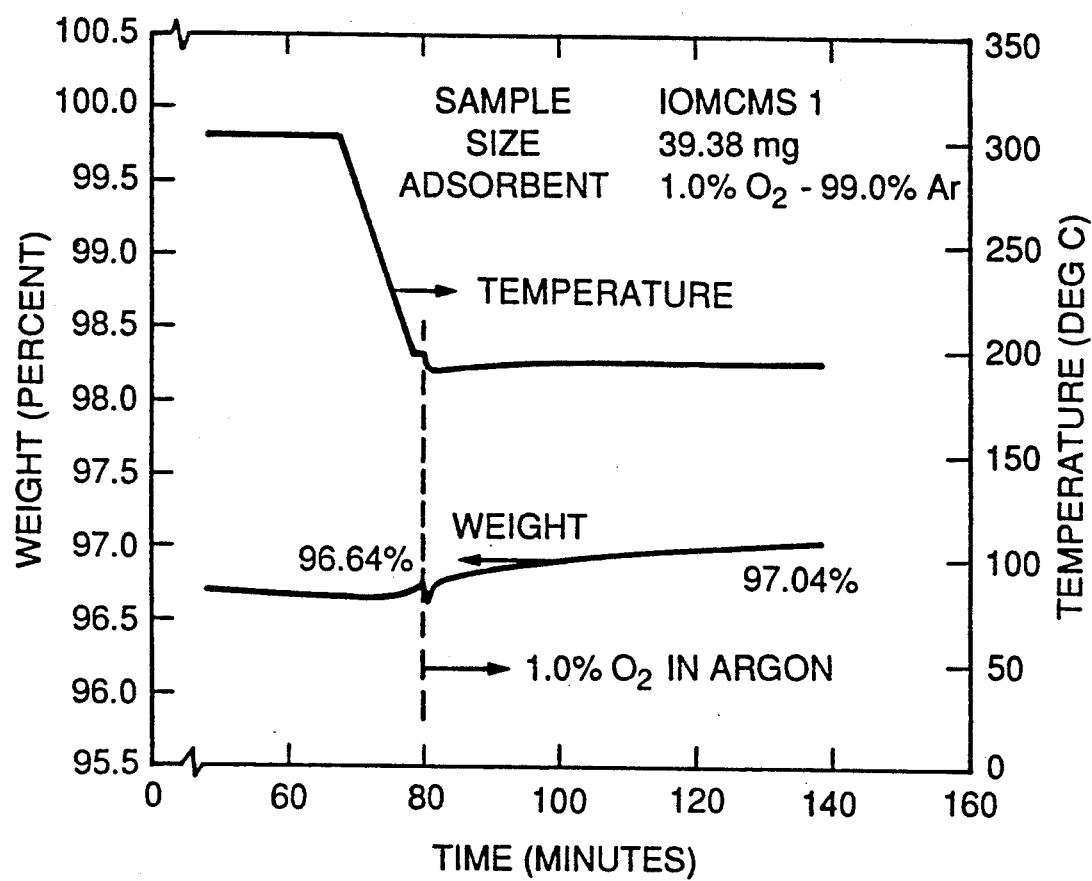
FIG. 11 is an adsorption curve for a 1.2% $O_2$/98.8% Ar gas mixture on a titania modified carbon molecular sieve, which is not a sorbent of this invention, conducted at 200° C.

For purpose of comparison to FIGS. 5 to 7, reference is now made to FIG. 11 which shows a sorption test with a known titania modified carbon molecular sieve composition, briefly referred to earlier as prior art sorbent composition CMS1, conducted at 200° C., which resulted in a combined argon and oxygen uptake of about 0.35% on a sorbent sample weight basis. It is to be noted that this prior art sorbent took up both oxygen and argon. As mentioned before, FIGS. 5 to 7 show the oxygen uptake curve for the copper modified carbon molecular sieve-sorbents of this invention at 200° C. was about 1.8, 0.7 and 2.0%, respectively, all of which are substantially higher than that achieved with prior art sorbent CMS1.

XPS measurements were made on fresh, reduced, and oxidized samples of the copper-modified carbon molecular sieve or "CMS" compositions in order to monitor the oxidation state of copper. The objective of these measurements was to be able to distinguish between $Cu^0$, $Cu^{+1}$, and $Cu^{+2}$ states in different copper-containing CMS samples as well as to determine if any oxygen was bound by C-O bonds. The XPS analysis was conducted using Surface Science Instrument Model No. SSX-50. XPS of Cu 2p, O 1s, C 1s and Cu Auger were investigated.

In addition, XRD analysis was conducted on samples of copper-free and copper-modified CMS samples. By a comparison of the copper-free and copper-modified CMS samples, the signals due to copper compounds in the XRD scans could be identified. One copper-containing CMS sample was reduced in a glass reactor and transferred to a 0.5 mm diameter glass capillary while maintained under an inert nitrogen atmosphere by conducting the transfer in a glove bag. The capillary was sealed with wax and the sample was subjected to XRD analysis. A determination of copper crystallite size was made using (i) Warren-Averbach method based on line broadening of the wide angle diffraction lines, (ii) small angle X-ray scattering using the Porod treatment or method as discussed by Pollack and Yen. The Warren-Averbach method is discussed in the text entitled "Elements of X-Ray Diffraction by B. D. Cullity, second edition (1978), Addison-Wesley at pages 284 and 285, which are hereby incorporated herein by reference. The Porod method is discussed in the article entitled "Structural Studies of Asphaltics by X-Ray Small Angle Scattering", Analytical Chemistry, Vol. 42 (1970), page 623, which is hereby incorporated herein by reference.

Figure 12:
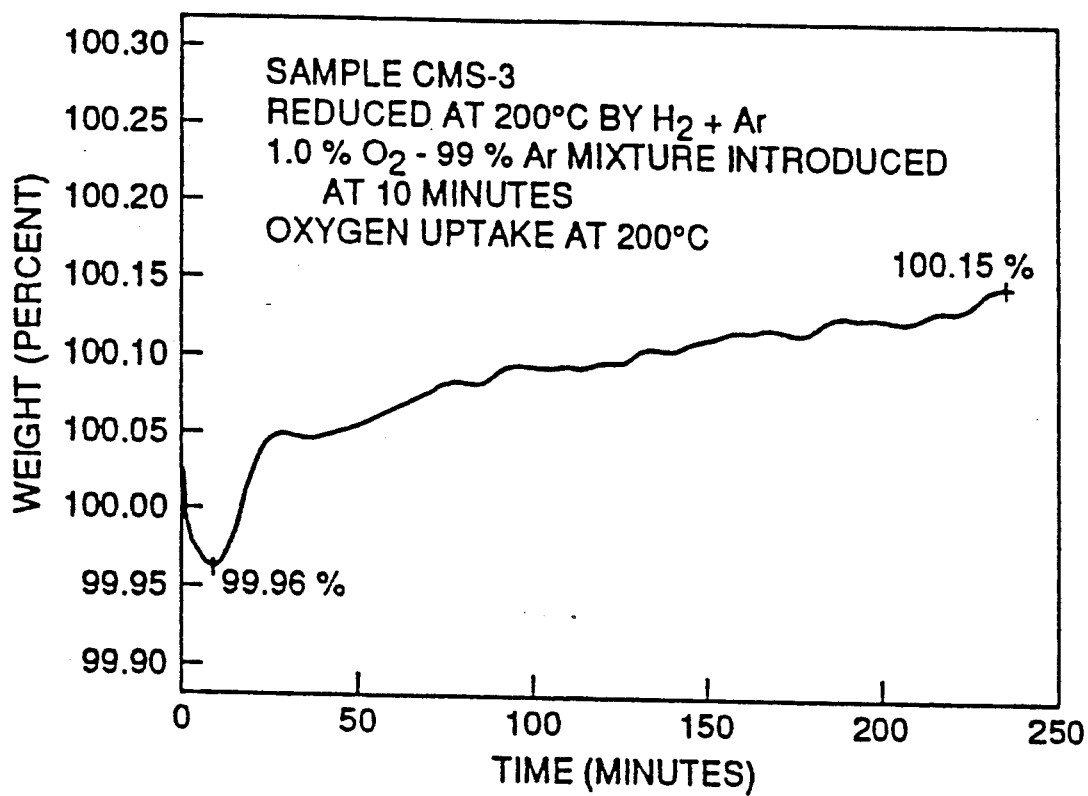
FIG. 12 is an oxygen uptake curve for oxygen from a 0.1% $O_2$/99.9% Ar gas mixture on copper-free composition designated CMS-3 which had been reduced at 200° C. by a hydrogen and argon mixture.

The following tests deal with copper-modified compositions CMS-CU3 and CMS-CU4 and a copper-free composition CMS-3, see FIG. 12 and TABLE I. The copper-free composition CMS-3 was made by pyrolyzing polyfurfuryl alcohol in absence of a copper-containing material.

Oxygen uptake by reduced composition CMS-CU3 at 200° C. is shown in FIG. 6. For comparison, oxygen uptake for the similarly treated copper-free composition CMS-3 is shown in FIG. 12. By comparing FIGS. 6 and 12, it is seen that the oxygen uptake rate for the copper-containing composition CMS-CU3 is significantly greater than for the copper-free composition CMS-3. In particular 100 minutes after the introduction of 1% $O_2$, 99% Ar gas mixture, the oxygen uptake by composition CMS-CU3 is higher than that for composition CMS-3 by a factor of five.

Figure 13:
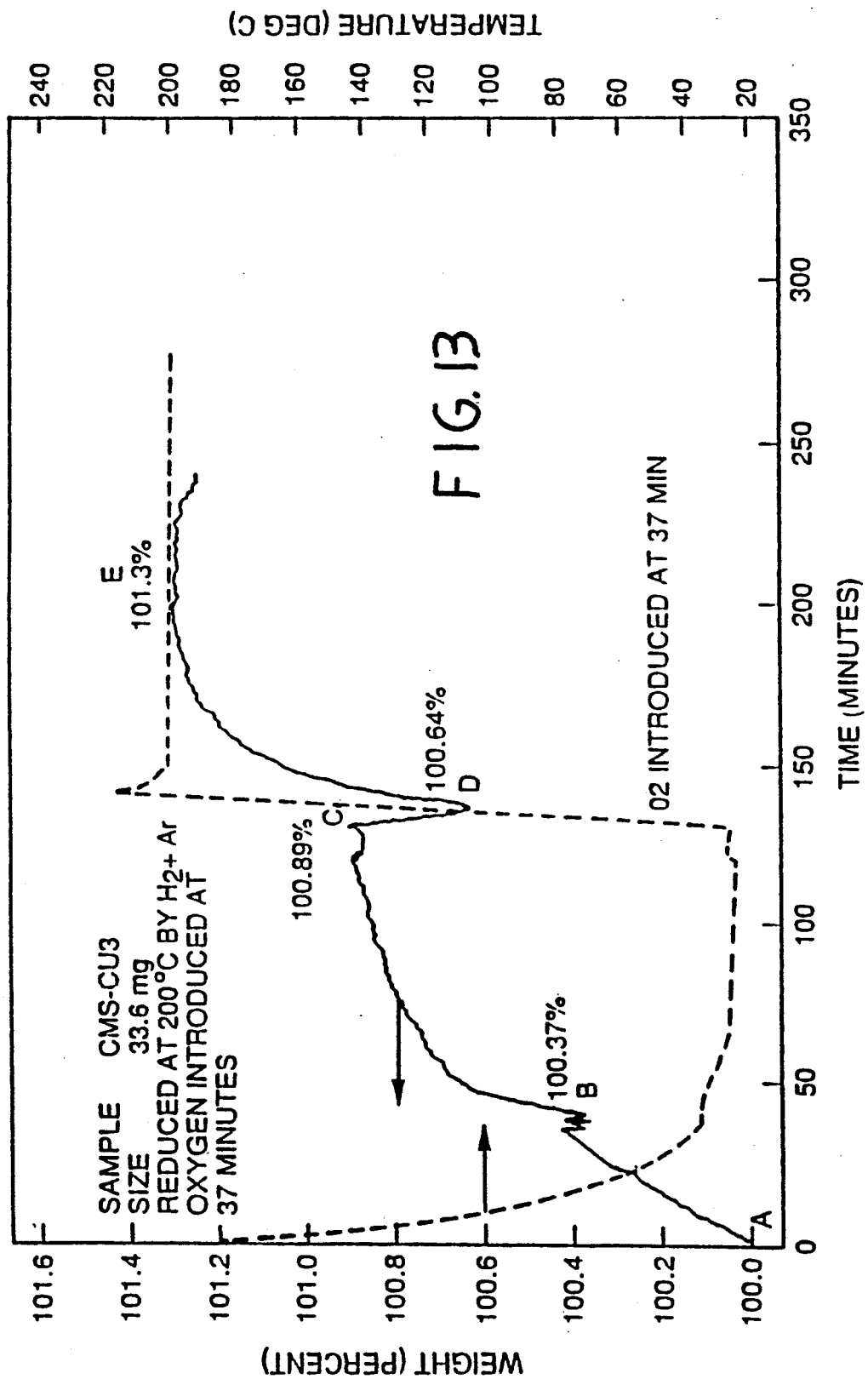
FIG. 13 is a weight increase curve from gases on the reduced third sorbent composition designated CMS-CU3 of this invention conducted at several temperatures.

In order to explore the temperature dependence of oxygen uptake by the copper modified CMS, a short series of oxidation tests, see FIG. 13, were conducted on another sample of composition CMS-CU3. The sample was first reduced at 200° C. Hydrogen was then cut off and the sample allowed to cool off in argon flow alone to 35° C. The sample weight increase during this period, shown in FIG. 13 by the AB portion of the solid curve, is primarily attributed to physical adsorption. In the next step argon flow was replaced with oxygen flow over the sample at 35° C. The sample weight increase during this period, shown by the BC portion of the curve, represents oxygen uptake at room temperature. In the final step, the sample was heated back to 200° C. while maintaining the oxygen flow. This first resulted in a weight reduction, primarily due to loss of physically adsorbed gas, represented by the CD portion of the curve. Then the sample weight subsequently increased as seen by the DE portion of the curve. This increase is mostly attributed to the additional uptake of oxygen by the copper at the higher temperature.

Figure 14:
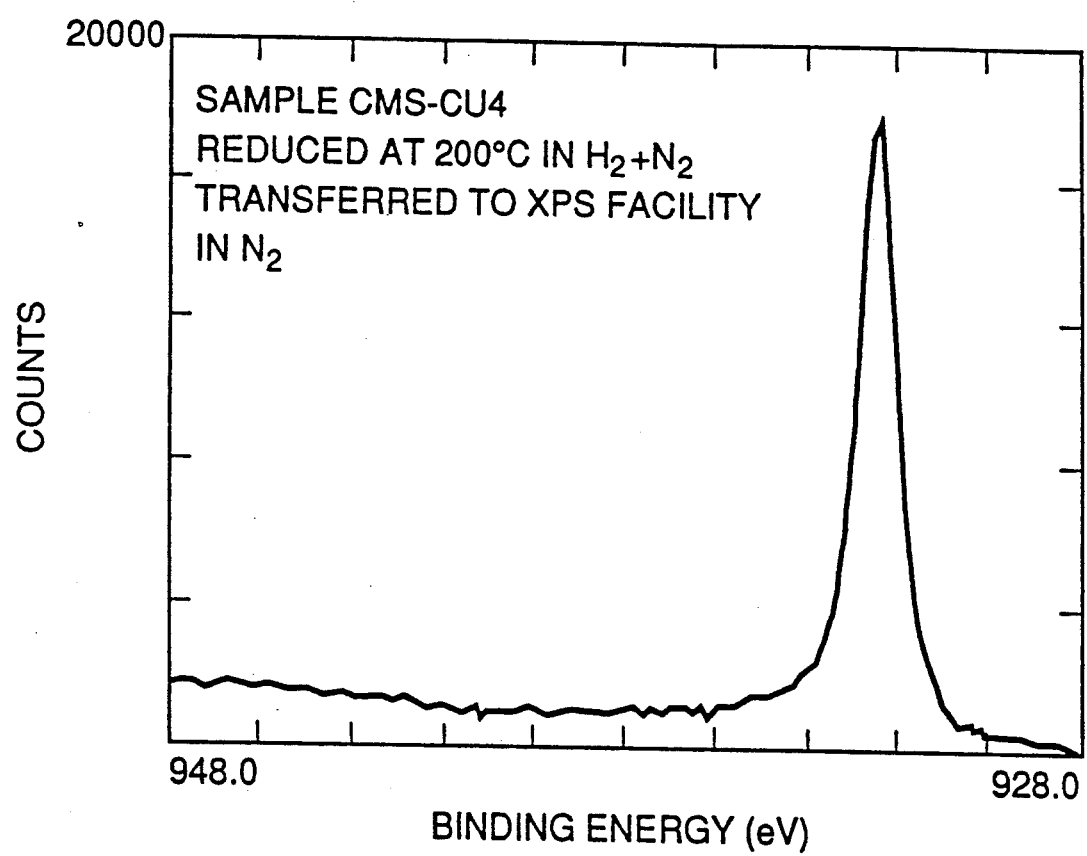
FIG. 14 is an XPS scan of Cu 2p for a sorbent composition designated CMS-CU4, which had been reduced at 200° C. in hydrogen and nitrogen mixture, maintained in oxygen-free environment.
Figure 15:
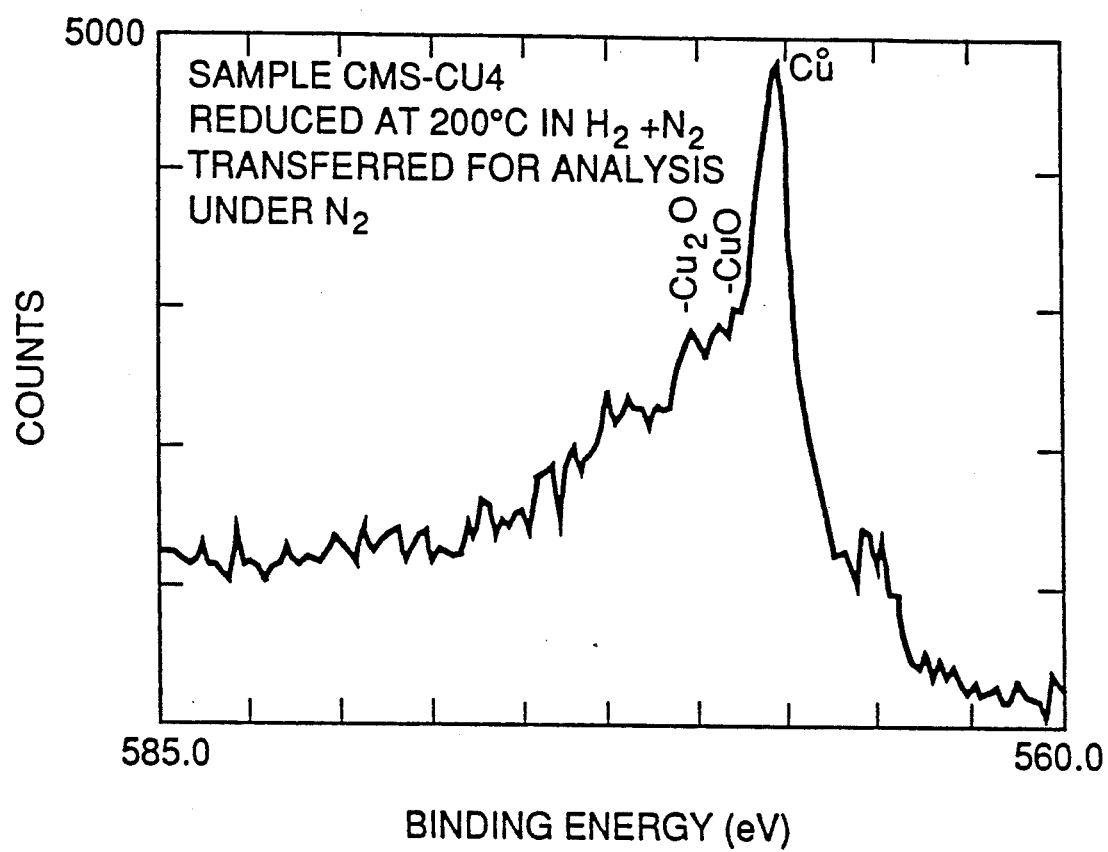
FIG. 15 is an XPS scan of Cu Auger for a sorbent composition designated CMS-CU4, which had been reduced at 200° C. in hydrogen and nitrogen mixture, maintained in oxygen-free environment.
Figure 16:
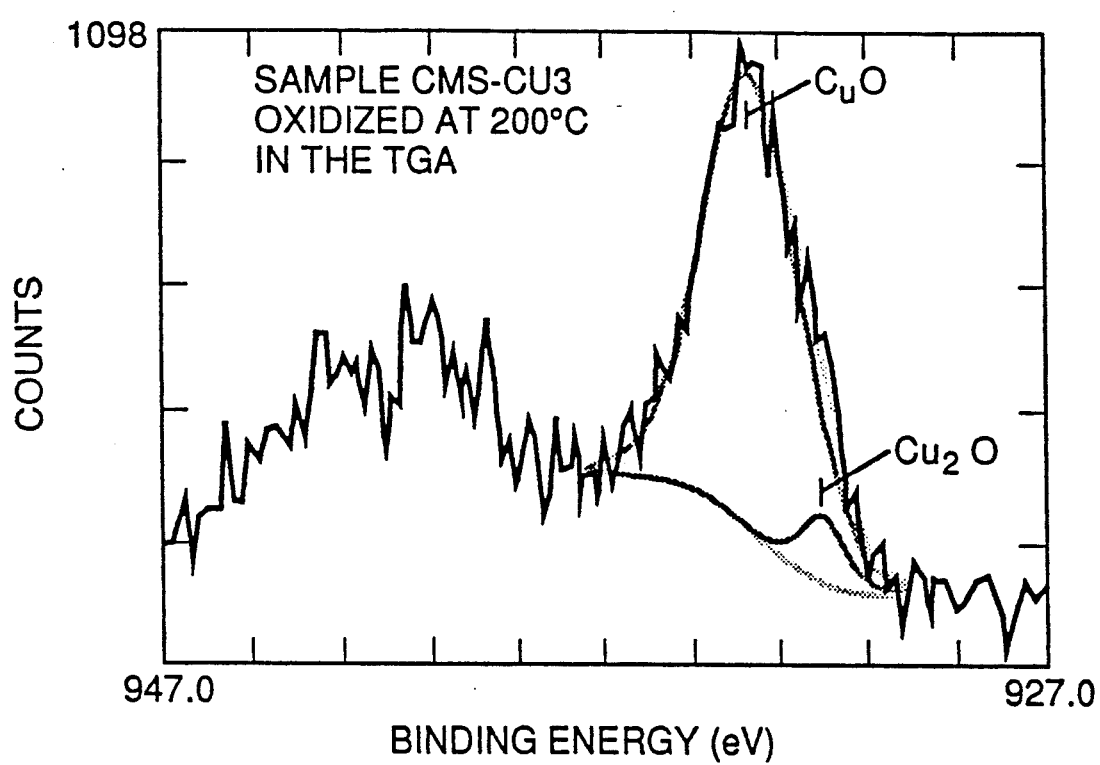
FIG. 16 is an XPS scan of Cu 2p for a sorbent composition designated CMS-CU3 which had been oxidized at 200° C. in the TGA.
Figure 17:
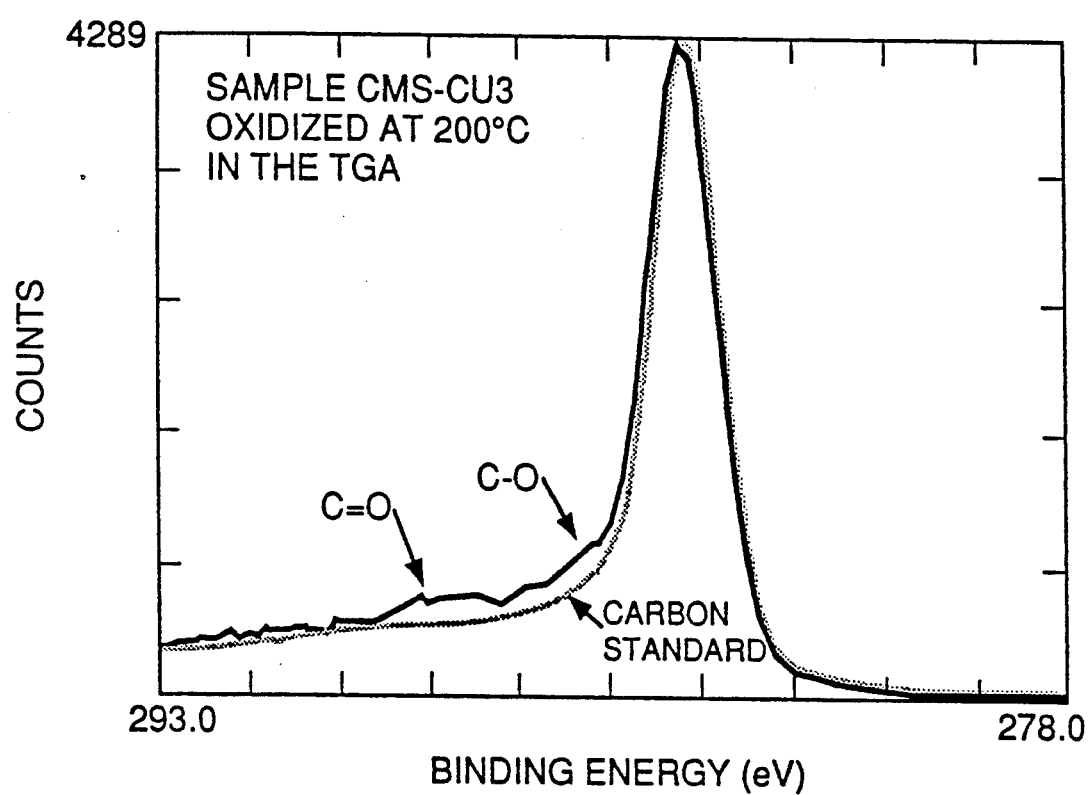
FIG. 17 is an XPS scan of C 1s for a sorbent composition designated CMS-CU3 which had been oxidized at 200° C. in the TGA.

XPS measurements were made on samples of fresh, reduced, and oxidized at 200° C., of copper modified carbons. Fresh composition CMS-CU3 showed copper in the sample to be in a mixed state, i.e. the +1 and +2 oxidation state. When the reduced composition CMS-CU3 sample was exposed to air during transfer of sample to the XPS facility, the oxidation state of copper was again mixed, i.e. +1 and +2, though the copper signal was weaker. Another sample of composition CMS-CU4 was reduced and transferred to the XPS vacuum chamber while maintained in an inert nitrogen atmosphere at all times. The XPS scan for this sample, showing the Cu 2p peak, is shown in FIG. 14, and the Cu Auger spectrum is shown in FIG. 15. These results show that the copper is present primarily in the Cu° or elemental state. The composition CMS-CU3 sample which had been oxidized at 200° C., following the reduction step, showed copper to be present primarily in the +2 oxidation state, i.e. as CuO. This is evident from the XPS scan for this sample shown in FIG. 16, which shows the Cu 2p region. In FIG. 16, the zigzag curve is the actual XPS data while the smooth curves represent processed data obtained by splitting the actual data into CuO and $Cu_2O$ contributions. The carbon C 1s peak in the XPS scan for this same sample is shown in FIG. 17. This peak shows evidence of C=O and C—O bond presence indicating that some oxygen has gone into bond formation with the carbon. Thus, at least a small part of total oxygen uptake at 200° C. is due to the carbon.

When the reduced sample of copper-containing CMS is exposed to air or oxygen, it is clear from both the TGA and XPS analyses that a part of the total copper present is rapidly oxidized. In fact, more detailed TGA tests such as those in FIG. 13 show that the reduced CMS samples exhibit some weight increase during the room temperature argon purge. This is mostly attributed to removal of trace oxygen from the commercial argon at room temperature. However, when the temperature is increased to 200° C., more oxygen is taken up by the copper, and in case of composition CMS-CU3, the copper on the carbon surface is almost completely oxidized to CuO. The XPS scan shown in FIG. 17 evidences the presence of C=O and C—O bonds on the carbon surface.

XRD analysis on the copper-free carbon composition CMS-3 and copper-containing composition CMS-CU4 in the reduced state, wherein sample transfer is made under inert nitrogen, helped in identification of the copper peaks in composition CMS-CU4 thereby enabling the determination of the average crystallite size. The crystallite size for elemental copper was determined using known methods, namely (i) the Warren-Averbach method using line broadening of the wide angle diffraction lines, and (ii) small angle X-ray scattering using the Porod treatment or method. The Warren-Averbach method yielded the average copper crystallite size as 140 Å, whereas the Porod treatment led to the average size of 300 Å.

The reduced samples displayed rapid oxidation at room temperature of about 50% of total copper present in presence of oxygen. The average crystallite size, 140–300 Å, though relatively small, would not lead to such extensive oxidation if no active sites were present. Therefore active sites are present and participate in room temperature oxidation of copper. Since the reduced sample does not exhibit any carbon-oxygen bonds, such bonds cannot act as activation sites. Therefore for room temperature oxidation, the active sites are generated during reduction due to copper-carbon interactions.

For the higher temperature oxidation of carbon-supported copper, the C—O and C=O bonds on the carbon surface were seen to be present.

The activation energy relating to copper oxidation may be determined from the Arrhenius plot representing the variation of ln(k) as a function of 1/T where k is the reaction rate constant.

Figure 18:
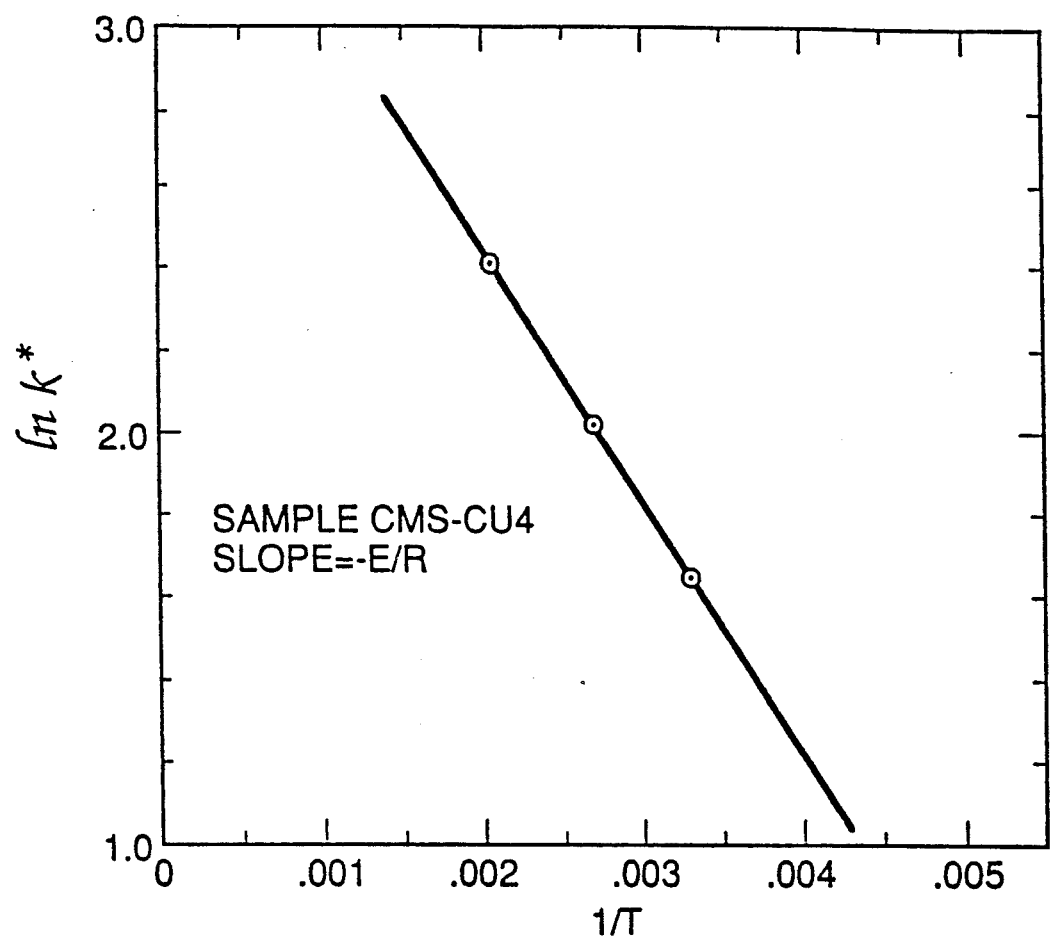
FIG. 18 is curve of reaction rate constant k* as a function of inverse temperature for oxygen uptake for a sorbent composition designated CMS-CU4.

The reaction rates for the reduced samples of composition CMS-CU4 for copper oxidation at temperatures of 30° C., 100° C., and 200° C., were obtained from the slope of the TGA plot of the sample weight versus time. For a given sample formulation and a fixed oxygen concentration, the reaction rate is proportional to the rate constant, k, which can be derived. For simplicity, another rate parameter k*, directly proportional to the rate constant k, was derived from the slope of the TGA plot. A plot of ln (k*) vs 1/T is shown in FIG. 18. The activation energy is derived from the slope of this plot, $-E/R$, where R is the Universal gas constant, and is found to be 1.22 kcals/g-mole. The low value of this activation energy is consistent with the rapid oxidation of copper at relatively low temperatures.

These results demonstrate that the oxidation of copper while dispersed in the carbon molecular sieve occurs by an activated process. The activation energy for copper oxidation in the temperature range 20°~200° C. was found to be as low as 1.22 kcals/g-mole. This supports the conclusion that the surface sites activate copper oxidation. For the reduced samples, up to 50% of copper may be oxidized at room temperature upon exposure to oxygen. Therefore, the corresponding active sites, for room temperature oxidation, are created during reduction due to copper-carbon interaction. The C—O bonds sites do not contribute to the room temperature oxidation of copper, however, these sites can be important at higher temperatures.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures and that variations in such minor details will be apparent to one skilled in the art.

Therefore it is to be understood that the present disclosure and emnodiments of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

TABLE 1

OXYGEN UPTAKE AND COPPER UTILIZATION FOR COPPER MODIFIED CARBON MOLECULAR SIEVES AT 200° C.

| Sorbent | Cu (Wt %) | C (Wt %) | Copper Additive in Precursor | Maximum Oxygen Uptake at 200° C. (Wt %) | Percent Copper Utilization |
|---|---|---|---|---|---|
| CMS-CU2 | 23.9 | 70.0 | Cupric Acetate | 1.80 | 30.0 |
| CMS-CU3 | 3.8 | 95.2 | Cupric Acetyl Acetonate | 0.70 | 73.0 |
| CMS-CU4 | 23.4 | 70.6 | Cupric Acetyl Acetonate | 2.00 | 34.0 |

What is claimed is:

1. A copper modified carbon molecular sieve-sorbent having both sorptive and molecular sieving capabilities, comprising a carbon molecular sieve and finely divided particles of elemental copper uniformly dispersed in the matrix of the carbon molecular sieve, wherein the particles of elemental copper have an average crystallite size of from about 100 Å to about 400 Å, wherein the finely divided elemental copper content of the molecular sieve-sorbent is from about 1 to about 40% by weight, and the carbon content thereof is from about 60 to about 99% by weight, and wherein the molecular sieve-sorbent has an effective pore size no greater than about 4.3 Å.

2. The molecular sieve-sorbent of claim 1, wherein the average crystallite size of the finely divided particles of elemental copper is from about 140 Å to about 300 Å.

3. The molecular sieve-sorbent of claim 1, wherein the average crystallite size of the finely divided particles of elemental copper is from about 200 Å to about 400 Å as measured by the Porod method.

4. The molecular sieve-sorbent of claim 1, wherein the average crystallite size of the finely divided particles of elemental copper is from about 100 Å to about 200 Å as measured by the Warren-Averbach method.

5. The molecular sieve-sorbent of claim 1, wherein the elemental copper content of the molecular sieve-sorbent is from about 2 to about 30% by weight and the carbon content is from about 70 to about 98% by weight.

6. The molecular sieve-sorbent of claim 1, wherein the elemental copper content of the molecular sieve-sorbent is from about 3 to about 25% by weight and the carbon content is from about 75 to about 97% by weight.

7. The molecular sieve-sorbent of claim 1, wherein the molecular sieve-sorbent is operable for selectively removing molecular oxygen from a gas containing molecular oxygen.

8. The molecular sieve-sorbent of claim 1, wherein the molecular sieve-sorbent is operable for selectively removing molecular oxygen from a gas containing molecular oxygen at a temperature from about 0° C. to about 600° C.

9. The molecular sieve-sorbent of claim 1, wherein the molecular sieve-sorbent is operable for selectively removing molecular oxygen from a gas containing molecular oxygen by converting the molecular oxygen to copper oxide by oxidation of the finely divided particles of elemental copper.

10. The molecular sieve-sorbent of claim 1, wherein at least about 50% by weight of the finely divided particles of elemental copper of the molecular sieve-sorbent will react with the molecular oxygen in a gas containing molecular oxygen.

11. The molecular sieve-sorbent of claim 1, wherein the molecular sieve-sorbent after sorbing molecular oxygen, can be regenerated by heating and reducing the molecular sieve-sorbent at an elevated temperature for a predetermined period of time.

12. The molecular sieve-sorbent of claim 1, wherein the molecular sieve-sorbent after sorbing molecular oxygen, can be regenerated by heating and reducing the molecular sieve-sorbent at an elevated temperature of at least as high as about 150° C. in a reducing environment for a predetermined period of time.

13. The molecular sieve-sorbent of claim 1, wherein the molecular sieve-sorbent after sorbing molecular oxygen, can be regenerated by heating the molecular sieve-sorbent at an elevated temperature of at least as high as about 150° C. in a dilute hydrogen-inert gas mixture for a predetermined period of time.

14. A copper modified carbon molecular sieve-sorbent operable for selectively removing molecular oxygen from a gas containing molecular oxygen, the copper modified carbon molecular sieve-sorbent having an effective pore size no greater than about 4.3 Å and containing finely divided particles of elemental copper dispersed therein, the copper modified carbon molecular sieve-sorbent formed by a. pyrolyzing a mixture comprising
   (i) a carbon-containing substance selected from the group consisting of polyfurfuryl alcohol, polyacrylonitrile, phenol-formaldehyde resin, polyvinylidene chloride and mixtures thereof, and
   (ii) a copper-containing material selected from the group consisting of cupric acetate, cupric acetylacetonate, cupric formate and mixtures thereof, into a copper oxide containing carbon molecular sieve and, after pyrolyzing, b. reducing the copper oxide therein to form a copper modified carbon molecular sieve-sorbent having finely divided particles of elemental copper uniformly dispersed therein.

15. The molecular sieve-sorbent of claim 14, wherein the elemental copper has an average crystallite size of from about 100 Å to about 400 Å.

* * * * *